United States Patent
Goldsberry et al.

(10) Patent No.: US 11,690,330 B2
(45) Date of Patent: Jul. 4, 2023

(54) AERATION SYSTEM AND METHOD

(71) Applicant: Aer-Aider LLC, Bainbridge Island, WA (US)

(72) Inventors: Michael Goldsberry, Bainbridge Island, WA (US); Martin Stickels, Bainbridge Island, WA (US)

(73) Assignee: AER-AIDER LLC, Bainbridge Island, WA (US)

(*) Notice: Subject to any disclaimer, the term of this patent is extended or adjusted under 35 U.S.C. 154(b) by 377 days.

(21) Appl. No.: 17/071,645

(22) Filed: Oct. 15, 2020

(65) Prior Publication Data
US 2021/0112733 A1    Apr. 22, 2021

Related U.S. Application Data

(60) Provisional application No. 62/916,943, filed on Oct. 18, 2019.

(51) Int. Cl.
*A01G 20/30*    (2018.01)
*A01B 45/02*    (2006.01)
*A01B 49/02*    (2006.01)

(52) U.S. Cl.
CPC ............ *A01G 20/30* (2018.02); *A01B 45/023* (2013.01); *A01B 49/022* (2013.01)

(58) Field of Classification Search
CPC ...... A01G 23/30; A01B 45/023; A01B 49/022
See application file for complete search history.

(56) References Cited

U.S. PATENT DOCUMENTS

| | | | | |
|---|---|---|---|---|
| 1,168,713 | A * | 1/1916 | Cummins | E01C 19/264 172/170 |
| 4,368,783 | A * | 1/1983 | Hake et al. | A01B 49/02 172/705 |
| 4,989,676 | A * | 2/1991 | Rogers | A01D 42/06 172/438 |
| 5,279,236 | A * | 1/1994 | Truax | A01C 5/064 111/139 |
| 5,477,927 | A | 12/1995 | Figura | |
| 5,547,030 | A * | 8/1996 | Takayama et al. | A47L 11/12 172/612 |
| 5,778,646 | A | 7/1998 | Pfisterer | |
| 6,805,205 | B1 | 10/2004 | Gabard | |
| 7,024,845 | B2 * | 4/2006 | Kallevig et al. | A01D 43/00 56/17.4 |

(Continued)

FOREIGN PATENT DOCUMENTS

GB    2187372 A  *  9/1987 ............. A01B 45/00
GB    2 268 385 A     1/1994

*Primary Examiner* — Thomas B Will
*Assistant Examiner* — Joel F. Mitchell
(74) *Attorney, Agent, or Firm* — Seed IP Law Group LLP

(57) ABSTRACT

An integrated aeration spreader for use with an aerator includes a mounting plate, a mounting block rigidly coupled to the mounting plate, a support arm rotatably coupled to the mounting plate, a support block rigidly coupled to the support arm, a shaft rotatably coupled to the support block, wherein the shaft extends through the mounting block, a first nut threaded on the shaft, a first spring having a first end engaged with the first nut and a second end engaged with the mounting block, a second nut threaded on the shaft, and a second spring having a first end engaged with the second nut and a second end engaged with the mounting block.

2 Claims, 8 Drawing Sheets

(56) References Cited

U.S. PATENT DOCUMENTS

| | | |
|---|---|---|
| 8,162,071 B2 | 4/2012 | Barger |
| 9,371,617 B2 * | 6/2016 | Thunstrom et al. .. E01C 23/082 |
| 2011/0079968 A1 * | 4/2011 | Murphy et al. ........ A01G 20/30 |
| | | 56/400.21 |
| 2012/0186214 A1 | 7/2012 | Michel |

* cited by examiner

AERATION SYSTEM AND METHOD

BACKGROUND

Technical Field

The present disclosure relates generally to a system and method for aerating grass using aerator and spreaders, and more specifically to a system and method that provides an integrated aeration process.

Description of the Related Art

Maintenance of golf courses and other grass-covered surfaces may include aerating the grass, such as with an aerator, at least in part to ensure that sufficient air reaches the root systems of the grass. Typically, aerating is performed using a plug aerator that pulls plugs of soil and grass from the golf courses and other grass-covered surfaces. Such maintenance may further include topdressing the grass, such as with a top dresser, which spreads sand or other materials across the top of the grass-covered surface. Additionally, such maintenance may include spreading the sand or other materials across the top of the grass-covered surface, such as with a spreader. Such techniques are often practiced at many golf courses throughout the world.

In one example, such maintenance may include using plug-type aerator to repeatedly puncture the ground and the grass-covered surface to form holes or openings therein across a grass-covered surface, such as of a golf course. Next, a top dresser may be used to distribute sand across the aerated ground and grass-covered surface. Finally, a spreader may be used to sweep or push the sand into the holes. The spreader may include a brush. Typically, each one of these steps typically requires a separate vehicle that drives across the ground and the grass-covered surface. Unfortunately, aerating the ground and grass-covered surface, particularly with a plug-type aerator, leaves that ground and grass-covered surface less stable and less able to support weight without partially collapsing due to the holes in numerous holes in the ground that have been created by the repeatedly puncture the ground and grass-covered surface. Compounding this ground stability issue, the typical aerating process of the ground and grass-covered surface then requires two more types of vehicles (i.e., the top dresser and the spreader) to drive over the stability compromised ground and grass-covered surface after the aerator formed holes in the ground and grass-covered surface. This typical aeration process potentially damages the ground and grass-covered surface by driving the top dresser vehicle and the spreader vehicle across the stability compromised ground and grass-covered surface that contains aerator formed holes.

There is a continuing need in the art for an aeration process that does not risk potentially damaging the ground and grass-covered surface by driving a top dresser vehicle and a spreader vehicle across stability compromised ground and grass-covered surface that contains aerator formed holes.

BRIEF SUMMARY

Briefly stated, the disclosed system and method provide an aeration process that involves combining a spike-type aeration and sand spreader that fills the aeration holes in a single pass of a vehicle, after having a top dresser vehicle lay sand down over the ground and grass-covered surface to be aerated. In this manner, the ground and grass-covered surface is never driver over in a stability compromising state after being aerated but before sand has been laid down and spreading into the aeration holes, which restores much of the ground stability.

A system may be summarized as comprising: an aerator having a rear end portion, a first side, and a second side opposite the first side; and a spreader coupled to the rear end portion of the aerator, the spreader including: a first mounting plate rigidly coupled to the first side of the aerator; a first mounting block rigidly coupled to the first mounting plate; a first support arm rotatably coupled to the first mounting plate; a first support block rigidly coupled to the first support arm, wherein the first mounting block is located a first distance from the first support block; a first shaft rotatably coupled to the first support block, wherein the first shaft extends through the first mounting block; a first nut threaded on the first shaft, wherein the first nut is located a second distance from the first support block and the second distance is less than the first distance; a first spring having a first end engaged with the first nut and a second end engaged with the first mounting block; a second nut threaded on the first shaft, wherein the second nut is located a third distance from the first support block and the third distance is greater than the first distance; and a second spring having a first end engaged with the second nut and a second end engaged with the first mounting block.

The first mounting plate may have first and second holes configured to receive fasteners for fastening the spreader to the aerator. The first spring may be identical to the second spring. The spreader may further include a third nut threaded on the first shaft and in contact with the first nut and a fourth nut threaded on the first shaft and in contact with the second nut. The first support arm may be coupled to the first mounting plate to be rotatable with respect to the first mounting plate about a first axis parallel to a second axis that extends from the first side of the aerator to the second side of the aerator.

The spreader may further include: a second mounting plate rigidly coupled to the second side of the aerator; a second mounting block rigidly coupled to the second mounting plate; a second support arm rotatably coupled to the second mounting plate; a second support block rigidly coupled to the second support arm, wherein the second mounting block is located a fourth distance from the second support block; a second shaft rotatably coupled to the second support block, wherein the second shaft extends through the second mounting block; a third nut threaded on the second shaft, wherein the third nut is located a fifth distance from the second support block and the fifth distance is less than the fourth distance; a third spring having a first end engaged with the third nut and a second end engaged with the second mounting block; a fourth nut threaded on the second shaft, wherein the fourth nut is located a sixth distance from the second support block and the sixth distance is greater than the fourth distance; and a fourth spring having a first end engaged with the fourth nut and a second end engaged with the second mounting block.

The spreader may further include a brush assembly that extends from the first support arm to the second support arm. The brush assembly may include a plurality of bristles. The brush assembly may include a first eyebolt proximate an end of the brush assembly coupled to the first support arm and a second eyebolt proximate an end of the brush assembly coupled to the second support arm. The system may further comprise a mat coupled to the first and second eyebolts. The aerator may be configured to create holes in a grassy ground surface and the bristles and the mat may be configured to spread sand across the grassy ground surface and into the holes created by the aerator.

A method of adjusting a spreader may be summarized as comprising threading either the first nut or the second nut along the first shaft. The threading may include threading the first nut toward the first mounting block, thereby compressing the first spring, threading the second nut toward the first mounting block, thereby compressing the second spring, threading the first nut away from the first mounting block, thereby allowing the first spring to extend, or threading the second nut away from the first mounting block, thereby allowing the second spring to extend.

DETAILED DESCRIPTION

Figure 1:
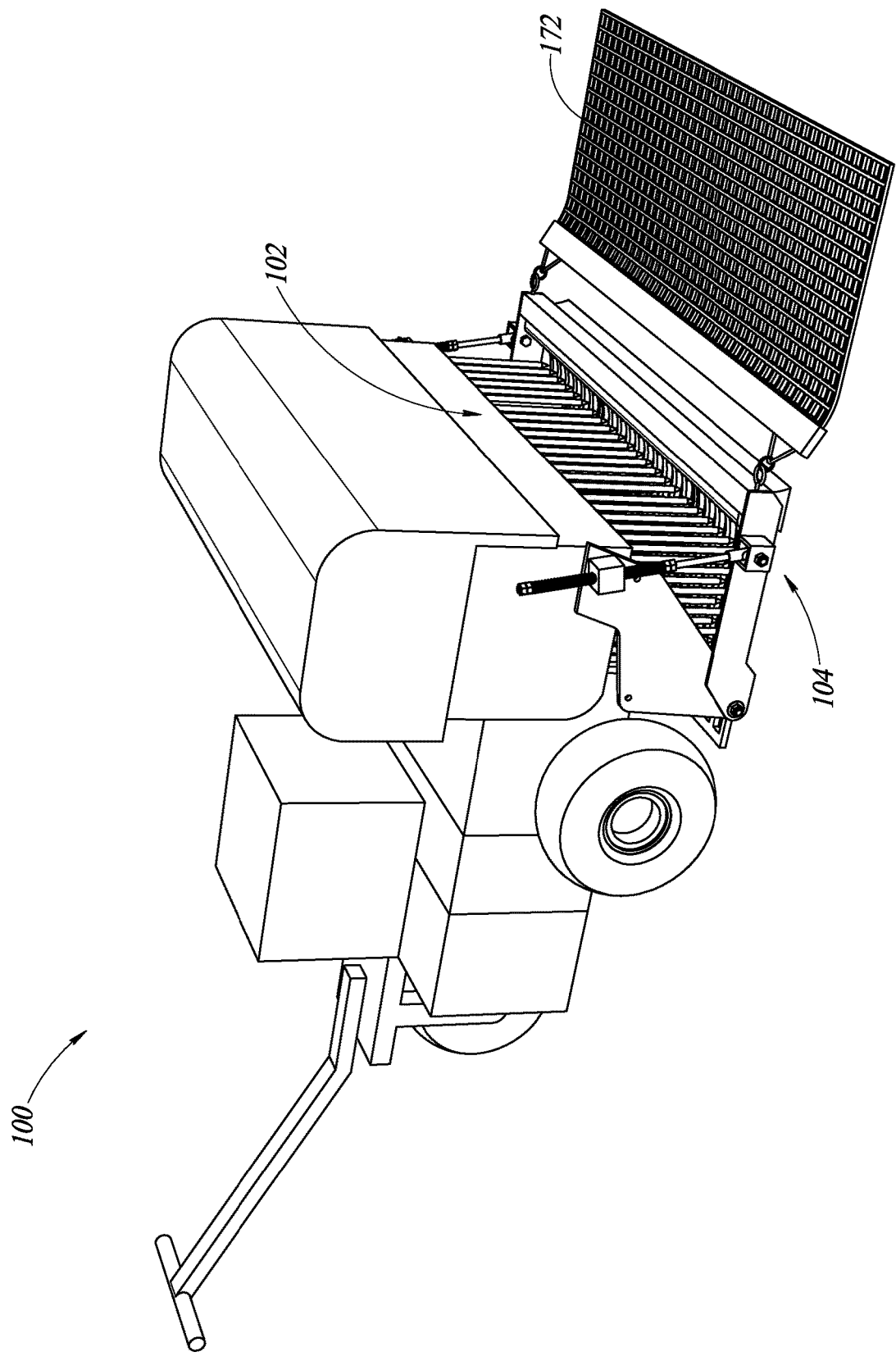
FIG. 1 illustrates a perspective view of an integrated aerator and spreader for use in maintaining grass-covered surfaces such as those at golf courses.

Persons of ordinary skill in the art will understand that the present disclosure is illustrative only and not in any way limiting. Other implementations and various combinations of the presently disclosed system and method readily suggest themselves to such skilled persons having the assistance of this disclosure.

This detailed description is intended to teach a person of skill in the art details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Throughout the specification, claims, and drawings, the following terms take the meaning explicitly associated herein, unless the context clearly dictates otherwise. The term "herein" refers to the specification, claims, and drawings associated with the current application. The phrases "in one implementation," "in another implementation," "in various implementations," "in some implementations," "in other implementations," and other variations thereof refer to one or more features, structures, functions, limitations, or characteristics of the present disclosure, and are not limited to the same or different implementations unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Moreover, the various features of the representative examples and the dependent claims may be combined in ways that are not specifically and explicitly enumerated in order to provide additional useful implementations of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples. Additionally, the headings and Abstract provided herein are for convenience only and do not limit the scope or meaning of the implementations.

In some embodiments of the integrated aerator and spreader 100, an aeration process is provided that involves combining a spike-type aeration and sand spreader that fills the aeration holes in a single pass of a vehicle, after having a top dresser vehicle lay sand down over the ground and grass-covered surface to be aerated. In this manner, the ground and grass-covered surface is never driven over in a stability compromising state after being aerated but before sand has been laid down and spreading into the aeration holes, which restores much of the ground stability. Until recently, the aeration process involved using a coring aerator (i.e., "plug aerator") that "pulls" plugs from the ground. While this type of coring aerator is successful in aerating the ground and grass-covered surface, it leaves the ground and grass-covered surface inherently less stable since a significant portion of the surface has been removed. Recently, spike aerator have become available. While these spike aerators are an improvement, since they push ground to the side to make a hole instead of removing ground to make a hole, spike aerators still leaves the ground and grass-covered surface inherently less stable since the surface has been repeated punctured. The integrated aerator and spreader 100 is used in conjunction with a spike aerator to fill the holes with sand before another vehicle in the aeration process has to drive over the aerated surface.

FIG. 1 illustrates an integrated aerator and spreader 100 for use in maintaining grass-covered surfaces such as those at golf courses. As illustrated in FIG. 1, the integrated aerator and spreader 100 includes an aerator portion 102 and a spreader portion 104 coupled to one another. In some implementations, the aerator 102 may be a commercially available aerator, such as an aerator available under the brand names Toro and/or ProCore, such as the Toro ProCore 648 model, such as an aerator available under the brand names John Deere and/or Aercore, such as one of the John Deere Aercore 800, 1000, 1500, or 2000 models, or such as an aerator available under the brand names Wiedenmann and/or Terra Spike Aerifier. As discussed above, the aerator 102 used in conjunction with the integrated aerator and spreader 100 is a spike aerator. The spike aerator is usually positioned at the rear end position on a mobile spike aerator device, such as the Wiedenmann and/or Terra Spike Aerifier.

In some embodiments, the aeration spreader 104 is attached to a trailing edge of a mobile spike aerator device (e.g., integrated aerator and spreader 100), just behind the spike aerator 102. In this manner, the aeration spreader 104 is positioned in a trailing position to the spike aerator 102. Accordingly, as the integrated aerator and spreader 100 makes a pass of movement across a ground surface (e.g., golf course fairway), the spike aerator 102 punches holes in the ground surface. In the single pass of movement of the integrated aerator and spreader 100 across the ground surface (e.g., golf course fairway), the aeration spreader 104 brushes sand into the punched holes in the ground surface made by the spike aerator of the integrated aerator and spreader 100. Prior to the single pass of movement of the integrated aerator and spreader 100, a top dresser mobile device has laid sand across the ground surface (e.g., golf course fairway) to be brushed into the punched holes by the aeration spreader 104. When using a spike aerator 102, a top dresser may lay sand down on the ground surface prior to the hole punching because the spikes simply push the sand to the side. In contrast, when using a traditional coring aerator that pulls plugs of soil out of the ground surface, it is very counterproductive to lay sand down on the ground surface prior to the pulling plug holes, since the plug pulling process would remove much of the sand that was just laid down.

As used herein, terminology such as "front," "rear," "left," and "right" is used in its conventional sense with respect to the aerator 102 and other components coupled thereto, and in particular with respect to a direction the aerator 102 is designed to travel while aerating a ground surface. For example, a "front" end of the aerator 102 is the leading end of the aerator 102 as it travels across the ground surface and a "rear" end of the aerator 102 is the trailing end of the aerator 102 as it travels across the ground surface. As used herein, terminology such as "outside" and "inside" is used in its conventional sense with respect to relative lateral locations of components with respect to a center line of the integrated aerator and spreader 100 along which it is designed to travel. For example, a first component located outside of a second component is located farther from the center line. As used herein, terminology such as "top," "bottom," "up," and "down" is used in its conventional sense with respect to a direction of a force of gravity, such that gravity pulls objects down.

Figure 2:
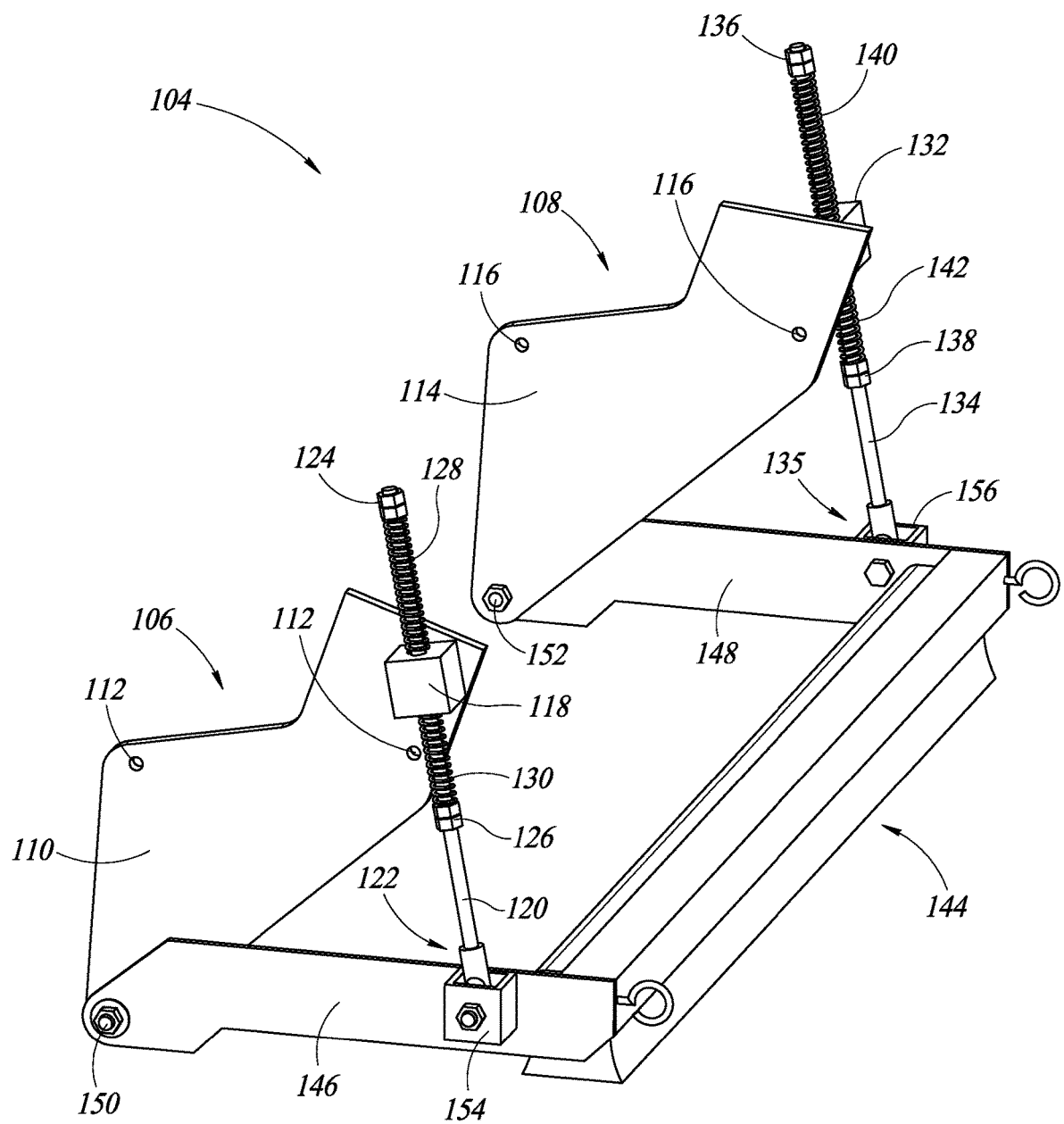
FIG. 2 illustrates a spreader portion of the system illustrated in FIG. 1, which may be coupled directly to a commercially-available aerator to form the integrated aerator and spreader.

FIG. 2 illustrates the spreader 104 by itself and separated from the aerator 102. As illustrated in FIG. 2, the spreader 104 includes a first or left-side mounting system 106 at a first or a left side thereof and a second or right-side mounting system 108 at a second or right side thereof opposite to the first side. The left-side mounting system 106 includes a first mounting plate 110 that, when the spreader 104 is coupled to the aerator 102, is rigidly mounted to a first or left side of a body of the aerator 102 and extends generally within a front-to-back and up-and down plane. For example, the first mounting plate 110 includes a plurality of (e.g., two) mounting holes or apertures 112. In some implementations, the holes 112 may be 0.469 inches in diameter. When the spreader 104 is coupled to the aerator 102, bolts, screws, or other fasteners can pass through the mounting holes 112 and into the side of the body of the aerator 102 to couple the first mounting plate 110 thereto. Notably, in other embodiments the first mounting plate 110 is not a plate shaped structure, but rather is another type or shape of structural linkage, such as a trapezoidal shaped structural linkage.

The right-side mounting system 108 includes a second mounting plate 114 that, when the spreader 104 is coupled to the aerator 102, is rigidly mounted to a second or right side of a body of the aerator 102 opposite to the first or left side thereof and extends generally within a front-to-back and up-and down plane and substantially parallel to the first mounting plate 110. For example, the second mounting plate 114 includes a plurality of (e.g., two) mounting holes or apertures 116. In some implementations, the holes 116 may be 0.469 inches in diameter. When the spreader 104 is coupled to the aerator 102, bolts, screws, or other fasteners can pass through the mounting holes 116 and into the side of the body of the aerator 102 to couple the second mounting plate 114 thereto. Thus, when the spreader 104 is coupled to the aerator 102, the first and second mounting plates 110, 114 may be rigidly coupled to the respective sides of the body of the aerator 102, and may be stationary with respect to the body of the aerator 102 during use. Notably, in other embodiments the second mounting plate 114 is not a plate shaped structure, but rather is another type or shape of structural linkage, such as a trapezoidal shaped structural linkage.

The left-side mounting system 106 also includes a first or left-side mounting block 118 rigidly affixed to the left-side mounting plate 110, such as to an upper, rear corner of an outer surface thereof. The mounting block 118 may be hollow to allow a threaded support shaft 120 of a support shaft system 122 to pass therethrough, such as through a bushing therein, and may include a section of a hollow square tube with a square plate coupled to a top end of the square tube, or a folded bracket with a plate welded on top of the folded bracket. In some implementations, the tube may be a 1¾ inch long section of 2 inch×2 inch×¼ inch square tubing material and the square plate may be a ¼ inch×2 inch×2 inch section of plate material. The square plate forming the top end of the mounting block 118 may have a hole or an aperture formed at a center thereof, such as to allow the shaft 120 to pass therethrough. In some implementations, the square plate may be welded to the top end of the square tube or the folded bracket to form the mounting block 118 and the mounting block 118 may be welded to the surface of the mounting plate 110. Notably, in other embodiments the first or left-side mounting block 118 is not a block shaped structure, but rather is another type or shape of attachment mount, such as a semi-hemispherical shaped attachment mount.

The left-side mounting system 106 also has a first adjustment mechanism that includes a first or top pair of threaded nuts 124 threaded onto the threaded shaft 120 at a location above the mounting block 118 and near or proximate to a top end of the shaft 120, and a second adjustment mechanism that includes a second or bottom pair of threaded nuts 126 threaded onto the threaded shaft 120 at a location below the mounting block 118 and near or proximate to a bottom end of the shaft 120. The first adjustment mechanism of the left-side mounting system 106 also includes a first or top coil spring 128 mounted on and extending around the shaft 120, with a first, top end thereof engaged with a bottom surface of the top pair of nuts 124 and a second, bottom end thereof engaged with a top surface of the square plate of the mounting block 118. The second adjustment mechanism of the left-side mounting system 106 also includes a second or bottom coil spring 130, which may have the same features as or be identical to the spring 128, mounted on and extending around the shaft 120, with a first, bottom end thereof engaged with a top surface of the bottom pair of nuts 126 and a second, top end thereof engaged with a bottom surface of the square plate of the mounting block 118.

The right-side mounting system 108 also includes a second or right-side mounting block 132 rigidly affixed to the right-side mounting plate 114, such as to an upper, rear corner of an outer surface thereof. The mounting block 132 may be hollow to allow a threaded support shaft 134 of a support shaft system 135 to pass therethrough, such as through a bushing therein, and may include a section of a hollow square tube with a square plate coupled to a top end of the square tube, or a folded bracket with a plate welded on top of the folded bracket. In some implementations, the tube may be a 1¾ inch long section of 2 inch×2 inch×¼ inch square tubing material and the square plate may be a ¼ inch×2 inch×2 inch section of plate material. The square plate forming the top end of the mounting block 132 may have a hole or an aperture formed at a center thereof, such as to allow the shaft 134 to pass therethrough. In some implementations, the square plate may be welded to the top end of the square tube or the folded bracket to form the mounting block 132 and the mounting block 132 may be welded to the surface of the mounting plate 114. Notably, in other embodiments the second or right-side mounting block 132 is not a block shaped structure, but rather is another type or shape of attachment mount, such as a semi-hemispherical shaped attachment mount.

The right-side mounting system 108 also has a first adjustment mechanism that includes a first or top pair of threaded nuts 136 threaded onto the threaded shaft 134 at a location above the mounting block 132 and near or proximate to a top end of the shaft 134, and a second adjustment mechanism that includes a second or bottom pair of threaded nuts 138 threaded onto the threaded shaft 134 at a location below the mounting block 132 and near or proximate to a bottom end of the shaft 134. The first adjustment mechanism of the right-side mounting system 108 also includes a first or top coil spring 140 mounted on and extending around the shaft 134, with a first, top end thereof engaged with a bottom surface of the top pair of nuts 136 and a second, bottom end thereof engaged with a top surface of the square plate of the mounting block 132. The second adjustment mechanism of the right-side mounting system 108 also includes a second or bottom coil spring 142, which may have the same features as or be identical to the spring 140, mounted on and extending around the shaft 134, with a first, bottom end thereof engaged with a top surface of the bottom pair of nuts 138 and a second, top end thereof engaged with a bottom surface of the square plate of the mounting block 132.

In alternative embodiments, the first and second adjustment mechanisms of the left-side mounting system 106 and the first and second adjustment mechanisms of the right-side mounting system 108 may include features other than the nuts and coil springs described herein and illustrated in the figures. In general, the adjustment mechanisms may include any components and/or features that provide some degree of flexibility and resiliency, allow adjustment of the flexibility or of a rigidity of the spreader 104 and a suspension system thereof, allow adjustment of a height of a brush of the spreader, and/or allow adjustment of a downforce exerted by the brush against a ground surface when the spreader 104 is in use. For example, the adjustment mechanisms may include other types of springs, such as torsion springs, serpentine springs, leaf springs, Belleville or coned-disc springs, or wave springs, in place of the coil springs described herein. In other examples, the adjustment mechanisms may include elastic bands, such as elastomer or rubber bands, in place of the coil springs described herein. In other examples, the adjustment mechanisms may include gas springs, other pneumatics, or hydraulic systems in place of the coil springs described herein.

Together, the springs 128, 130, 140, and 142 form a suspension system for the spreader 104 and for a brush assembly or system 144 thereof. When the spreader 104 is coupled to the aerator 102, the nuts 124, 126, 136, and 138 allow an operator to adjust the operation of the suspension system (i.e., of the springs 128, 130, 140, and 142), such as to promote uniform brush-to-ground contact and allow the brush to float over slopes and slight undulations in the ground surface. For example, the nuts 124 can be threaded downward along the shaft 120 and the nuts 136 can be threaded downward along the shaft 134 (or the shaft 120 can be threaded upward through the nuts 124 and the shaft 134 can be threaded upward through the nuts 136) to compress the springs 128 and 140, increase an overall rigidity of the suspension system, raise the elevation of the brush system 144 with respect to the ground surface, and/or decrease a downforce the brush system 144 exerts against the ground surface. Alternatively, the nuts 124 can be threaded upward along the shaft 120 and the nuts 136 can be threaded upward along the shaft 134 (or the shaft 120 can be threaded downward through the nuts 124 and the shaft 134 can be threaded downward through the nuts 136) to allow the springs 128 and 140 to extend, decrease an overall rigidity of the suspension system, lower the elevation of the brush system 144 with respect to the ground surface, and/or increase a downforce the brush system 144 exerts against the ground surface.

As another example, the nuts 126 can be threaded downward along the shaft 120 and the nuts 138 can be threaded downward along the shaft 134 (or the shaft 120 can be threaded upward through the nuts 126 and the shaft 134 can be threaded upward through the nuts 138) to allow the springs 130 and 142 to extend, decrease an overall rigidity of the suspension system, raise the elevation of the brush system 144 with respect to the ground surface, and/or decrease a downforce the brush system 144 exerts against the ground surface. Alternatively, the nuts 126 can be threaded upward along the shaft 120 and the nuts 138 can be threaded upward along the shaft 134 (or the shaft 120 can be threaded downward through the nuts 126 and the shaft 134 can be threaded downward through the nuts 138) to compress the springs 130 and 142, increase an overall rigidity of the suspension system, lower the elevation of the brush system 144 with respect to the ground surface, and/or increase a downforce the brush system 144 exerts against the ground surface.

In another example, the springs 128, 130, 140, and 142 have the same features as, or are identical to, one another. In such an example, the nuts 124, 126, 136, and 138 can be threaded downward along the respective shafts by the same distances (or the shafts can be threaded upward through the respective nuts) to allow the springs 128, 130, 140, and 142 to maintain the same length, maintain a constant overall rigidity of the suspension system, raise the elevation of the brush system 144 with respect to the ground surface, and/or decrease a downforce the brush system 144 exerts against the ground surface. Alternatively, the nuts can be threaded upward along the respective shafts (or the shafts can be threaded downward through the respective nuts) to allow the springs to maintain the same length, maintain a constant overall rigidity of the suspension system, lower the elevation of the brush system 144 with respect to the ground surface, and/or increase a downforce the brush system 144 exerts against the ground surface.

In another example, the springs 128, 130, 140, and 142 have the same features as, or are identical to, one another. In such an example, the nuts 124, 126, 136, and 138 can each be threaded by the same distance along the respective shafts toward one another (e.g., the nuts 124 and 136 can be threaded downward and the nuts 126 and 138 can be threaded upward) to compress the springs 128, 130, 140, and 142, increase an overall rigidity of the suspension system, maintain a constant elevation of the brush system 144 with respect to the ground surface, and/or maintain a constant downforce the brush system 144 exerts against the ground surface. Alternatively, the nuts 124, 126, 136, and 138 can each be threaded by the same distance along the respective shafts away from one another (e.g., the nuts 124 and 136 can be threaded upward and the nuts 126 and 138 can be threaded downward) to allow the springs 128, 130, 140, and 142 to extend, decrease an overall rigidity of the suspension system, maintain a constant elevation of the brush system 144 with respect to the ground surface, and/or maintain a constant downforce the brush system 144 exerts against the ground surface.

As illustrated in FIG. 2, the spreader 104 also includes a first or left-side support arm or support bar 146 rotatably coupled to the left-side mounting plate 110, such as at a hinge 150 located at a lower, forward corner of an outer surface thereof, such as with a nylon washer positioned between the support bar 146 and the mounting plate 110. The spreader 104 also includes a second or right-side support arm or support bar 148 rotatably coupled to the right-side mounting plate 114, such as at a hinge 152 located at a lower, forward corner of an outer surface thereof, such as with a nylon washer positioned between the support bar 148 and the mounting plate 114. In some implementations, the hinges 150 and 152 may include ½ inch diameter, 1¾ inch machine bolts with lock nuts, washers, and bushings. Thus, the support bars 146 and 148 can rotate with respect to the mounting plates 110 and 114 about a common axis that extends left-to-right across the spreader 104. As illustrated in FIG. 2, the spreader 104 also includes the brush system 144, which may extend left-to-right across the spreader 104 and along an axis parallel to the axes of rotation of the hinges 150 and 152. The brush system 144 may be coupled at a first, left-most end thereof to a rear-most end of an inner surface of the left-side support bar 146, and at a second, right-most end thereof opposite the first to a rear-most end of an inner surface of the right-side support bar 148.

Figure 3:
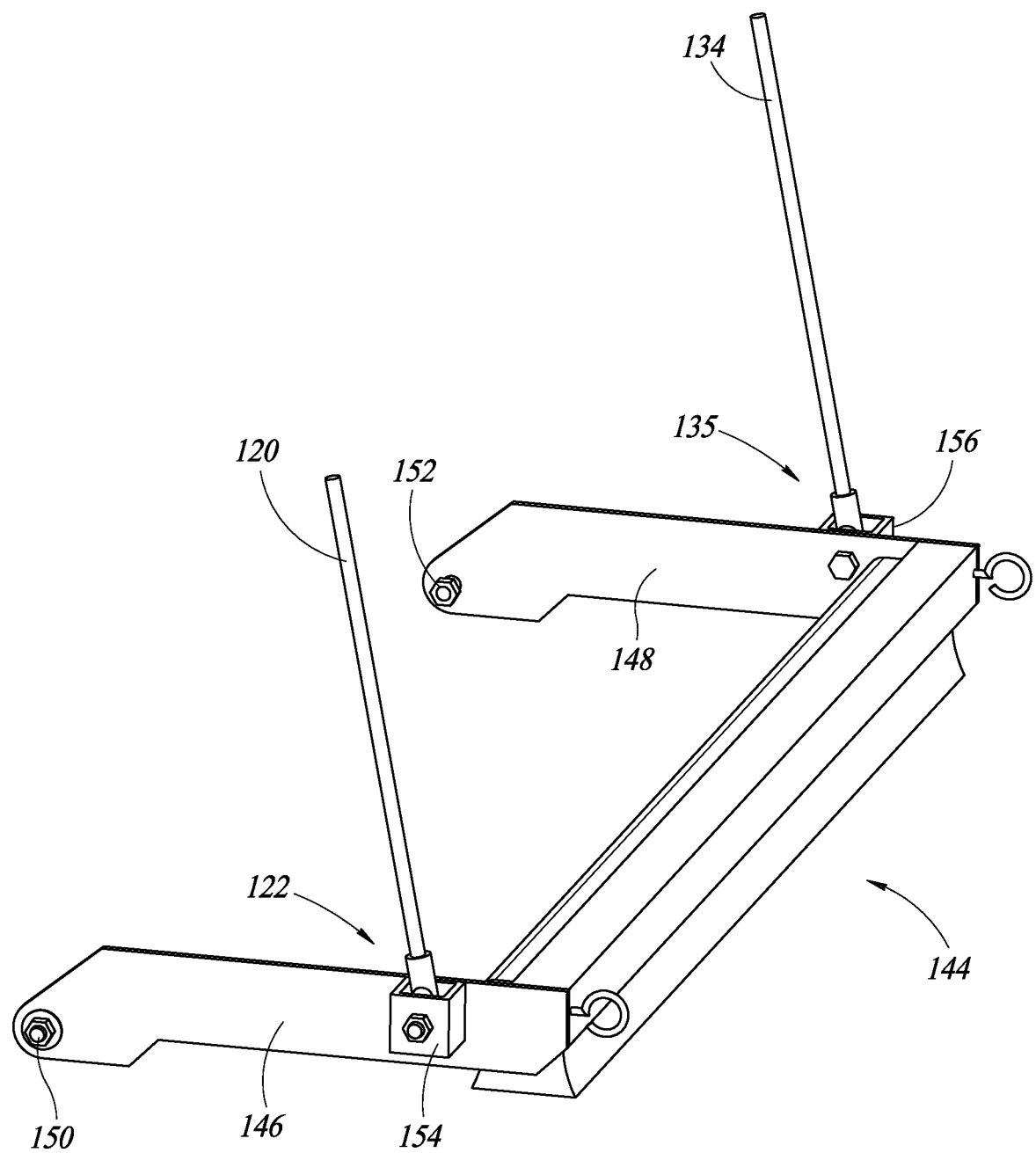
FIG. 3 illustrates the spreader of FIG. 2 with mounting systems thereof removed to illustrate other features.

FIG. 3 illustrates the spreader of FIG. 2 with the mounting systems 106 and 108 thereof removed to illustrate other features. As illustrated in FIG. 3, the spreader 104 includes a first or left-side support block 154 rigidly affixed to the left-side support bar 146, such as to a rear portion of an outer surface thereof. The support block 154 may be hollow to accommodate support elements for the threaded support shaft 120 therein, and may include a section of a hollow square tube. In some implementations, the tube may be a 2 inch long section of 2 inch×2 inch×¼ inch square tubing material. In some implementations, the support block 154 may be welded to the surface of the support bar 146. Notably, in other embodiments the first or left-side support block 154 is not a block shaped structure, but rather is another type or shape of support mount, such as a semi-hemispherical shaped support mount.

The spreader 104 also includes a second or right-side support block 156 rigidly affixed to the right-side support bar 148, such as to a rear portion of an outer surface thereof. The support block 156 may be hollow to accommodate support elements for the threaded support shaft 134 therein, and may include a section of a hollow square tube. In some implementations, the tube may be a 2 inch long section of 2 inch×2 inch×¼ inch square tubing material. In some implementations, the support block 156 may be welded to the surface of the support bar 148. Notably, in other embodiments the second or right-side support block 156 is not a block shaped structure, but rather is another type or shape of support mount, such as a semi-hemispherical shaped support mount.

Figure 4:
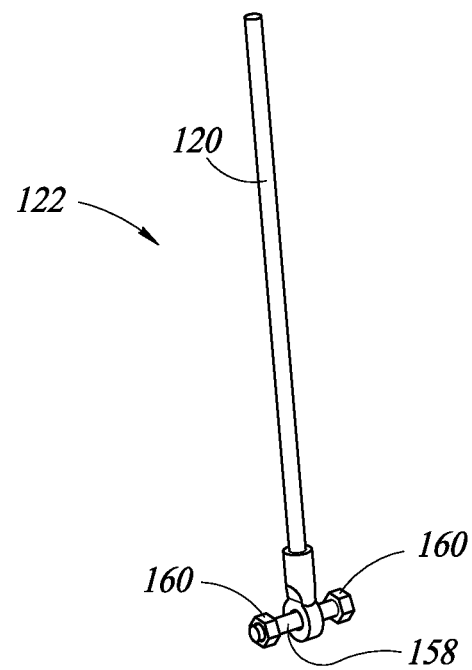
FIG. 4 illustrates a support shaft system of the spreader of FIG. 2 by itself to illustrate additional features.

FIG. 4 illustrates the support shaft system 122 of the spreader 104 by itself to illustrate additional features thereof. The support shaft system 135 may have the same features and functionality as that described herein for the support shaft system 122. As illustrated in FIG. 4, the support shaft system 122 includes a support rod or shaft 158 and one or more nuts 160 that can secure the shaft 158 to the support block 154 such that the shaft 158 extends left-to-right across the support block 154 and along an axis parallel to the axes of rotation of the hinges 150 and 152. In some implementations, the shaft 158 and one or more nuts 160 may include a ½ inch diameter 3" machine bolt with a lock nut and washer. A terminal bottom end portion of the support shaft 120 may be coupled to another component having an aperture or an opening therein through which the shaft 158 extends, such that the support shaft 120 is rotatable about the shaft 158 and about an axis parallel to the axes of rotation of the hinges 150 and 152. For example, the terminal bottom end portion of the support shaft 120 may be coupled to a ½ inch diameter lubrication-free ball joint rod end coupled to the shaft 158. In such cases, the lubrication-free ball joint rod end may have a cavity with internal threads corresponding to the threads of the support shaft 120 such that the terminal bottom end portion of the support shaft 120 may be threaded into the cavity.

Figure 5:
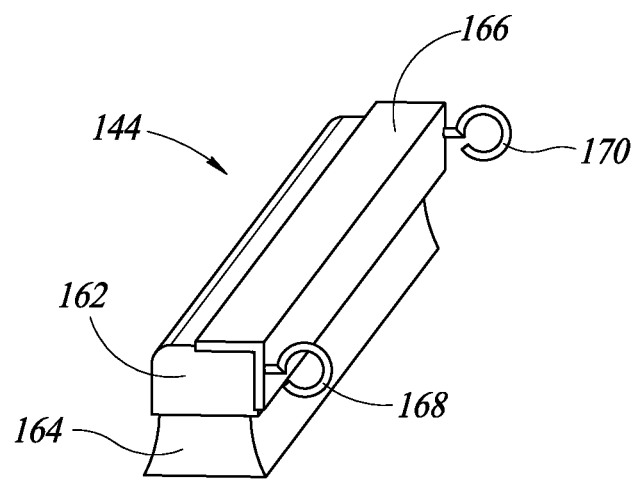
FIG. 5 illustrates a brush system of the spreader of FIG. 2 by itself to illustrate additional features.

FIG. 5 illustrates the brush system 144 by itself to illustrate additional features thereof. The brush system 144 includes a component to hold a plurality of bristles, which may be, for example, a ferrule or a block of solid material such as wood 162, as well as a plurality of bristles 164 held by the block 162. The brush system 144 also includes an angle bracket 166 having a pair of legs, with a first leg extending along a top surface of the block 162 and a second leg extending along a rear surface of the block 162. In some implementations, the angle bracket is a 2 inch×2 inch×¼ inch angle bracket, has a plurality of (e.g., six) ³⁄₁₆ inch diameter holes formed in its first leg to receive screws for screwing the block 162 thereto. In some implementations, a first, left-side end of the angle bracket is welded to the first support bar 146 and a second, right-side end of the angle bracket is welded to the second support bar 148. The brush system 144 also includes a first, left side eyebolt 168 that extends through a left end portion of the second leg of the angle bracket 166 and into a left end portion of the block 162, and a second, right side eyebolt 170 that extends through a right end portion of the second leg of the angle bracket 166 and into a right end portion of the block 162. In some implementations, the eyebolts 168 and 170 may be 5/16 inch stainless steel eyebolts with lock nuts.

In some implementations, the brush system 144, including its block 162, bristles 164, and angle bracket 166, can be a replaceable, turf-friendly brush that is 4 feet long from the left end to the right end thereof. In some implementations, a spreading mat 172, as illustrated in FIG. 1, may be coupled to the eyebolts 168 and 170 and dragged thereby behind the spreader 104 when the integrated aerator and spreader 100 is in operation. In other implementations, the eyebolts 168 and 170 can be used as attachment points for any other components to be pulled behind the integrated aerator and spreader 100 when it is in operation.

Any of the components of the integrated aerator and spreader 100 described herein may be fabricated from steel, such as A36 plate steel, or aluminum, such as a 6061 aluminum alloy. Aluminum is lighter than steel, and is less prone to rusting and corrosion. However, steel may have a protective coating applied thereto, such as a powder coating that forms a protective layer and offers a resilient coating to protect from corrosion. For example, the first and second mounting plates 110, 114, first and second mounting blocks 118, 132, first and second support bars 146, 148, first and second support blocks 154, 156, support shaft 158, angle bracket 166, first and second eyebolts 168, 170, and spreading mat 172 may be fabricated from steel, such as A36 plate steel, or aluminum, such as a 6061 aluminum alloy. In some implementations, the shafts 120 and 134 may be ½ inch diameter stainless steel shafts having fine threads and lengths of 18 inches, 20 inches, 22 inches, 24 inches, or between 18 inches and 24 inches. In some implementations, the nuts 124, 126, 136, 138, and 160 may be stainless steel nuts. In some implementations, the springs 128, 130, 140, and 142 may be 302 stainless steel, corrosion-resistant compression springs having lengths of 5 inches, outside diameters of 0.75 inches, and inside diameters of 0.54 inches. In some implementations, a total weight of the spreader 104 is about 20 pounds, which is low enough that it does not substantially affect performance of commercially-available aerators or the aerator 102.

In some implementations, a total width of the spreader 104 from a left side thereof to a right side thereof is 4 feet, 2¼ inches, a height of the spreader 104 from a top end thereof to a bottom end thereof is about 18, 20, 22, 24, or 26 inches, or between 18 and 26 inches, and a total length of the spreader 104 from a front end thereof to a rear end thereof is about 18, 20, 22, 24, or 26 inches, or between 18 and 26 inches. The integrated aerator and spreader 100 includes both an aerator 102 and a spreader 104. In some implementations, the integrated aerator and spreader 100 also includes a top-dresser, which may be used to spread sand over the ground surface either prior to or after aeration thereof. In some implementations, an integrated top dresser and spreader may include a commercially available top dresser and the spreader 104 described herein coupled directly thereto, to spread sand or other materials deposited on the ground surface by the top dresser, such as to brush sand into a canopy of the grass and stand up blades of the grass for a uniform cut upon the next mowing.

The integrated aerator and spreader 100 provides several advantages. For example, it allows hands-free incorporation of sand into aeration holes immediately after making the holes over dry sand. It also replaces systems that drag sand into holes that typically leave ruts in soft, freshly aerated turf. With dry sand in particular, it also reduces or eliminates bridging of sand in aeration holes, increasing or improving replacement of the void created by the aeration tine. Further, it can save many hours of labor by completing aeration and brushing at the same time.

In some implementations, any combination of the features described herein may be bundled together into a "retrofit kit" that can be marketed and sold separately and apart from an aerator, such as aerator 102, and that can be coupled or retrofit onto an existing aerator, such as the aerator 102 or any of the aerators described herein. A method of making and using the integrated aerator and spreader 100 may include de-coupling and/or disassembling components from an existing aerator, such as a roller or other similar components thereof, as well as springs or other similar components configured to bias or urge the roller toward or into the ground surface.

Figure 6A:
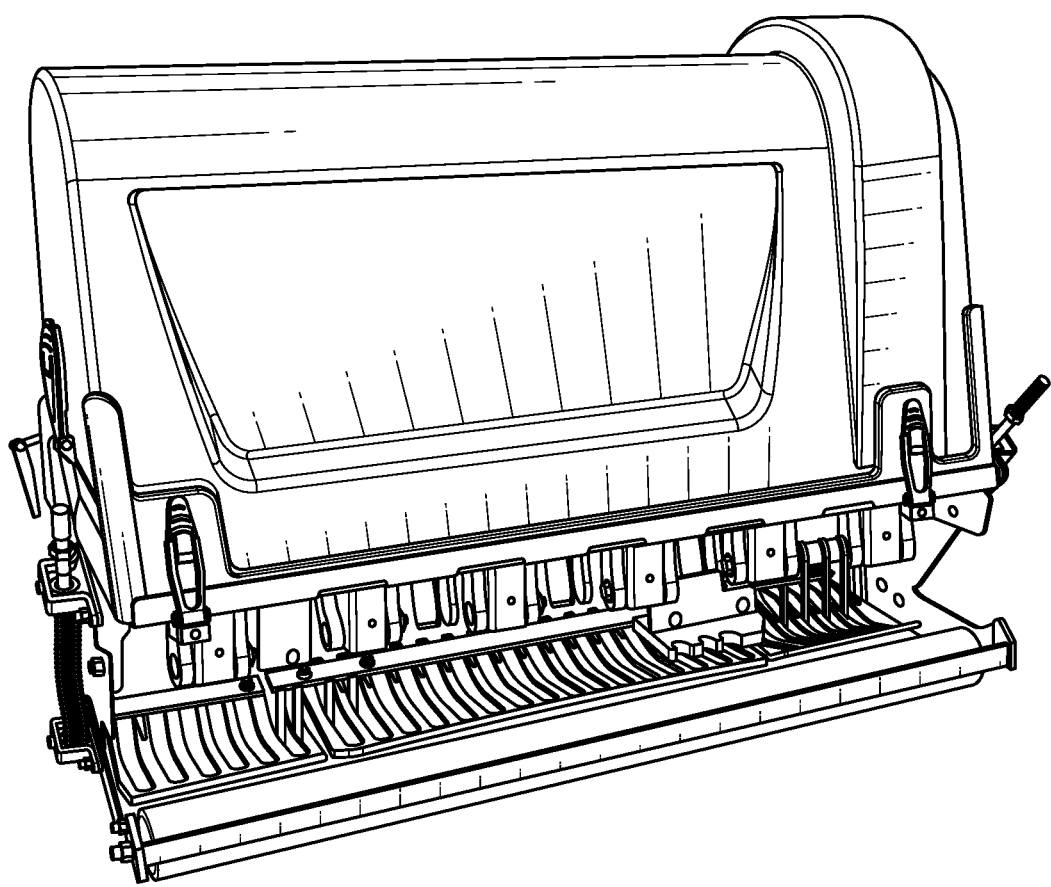
FIG. 6A illustrates a prior art roller system in a first stage of a retrofit method to modify the roller system in which an original roller and an original spring system are still in place, as described herein.
Figure 6B:
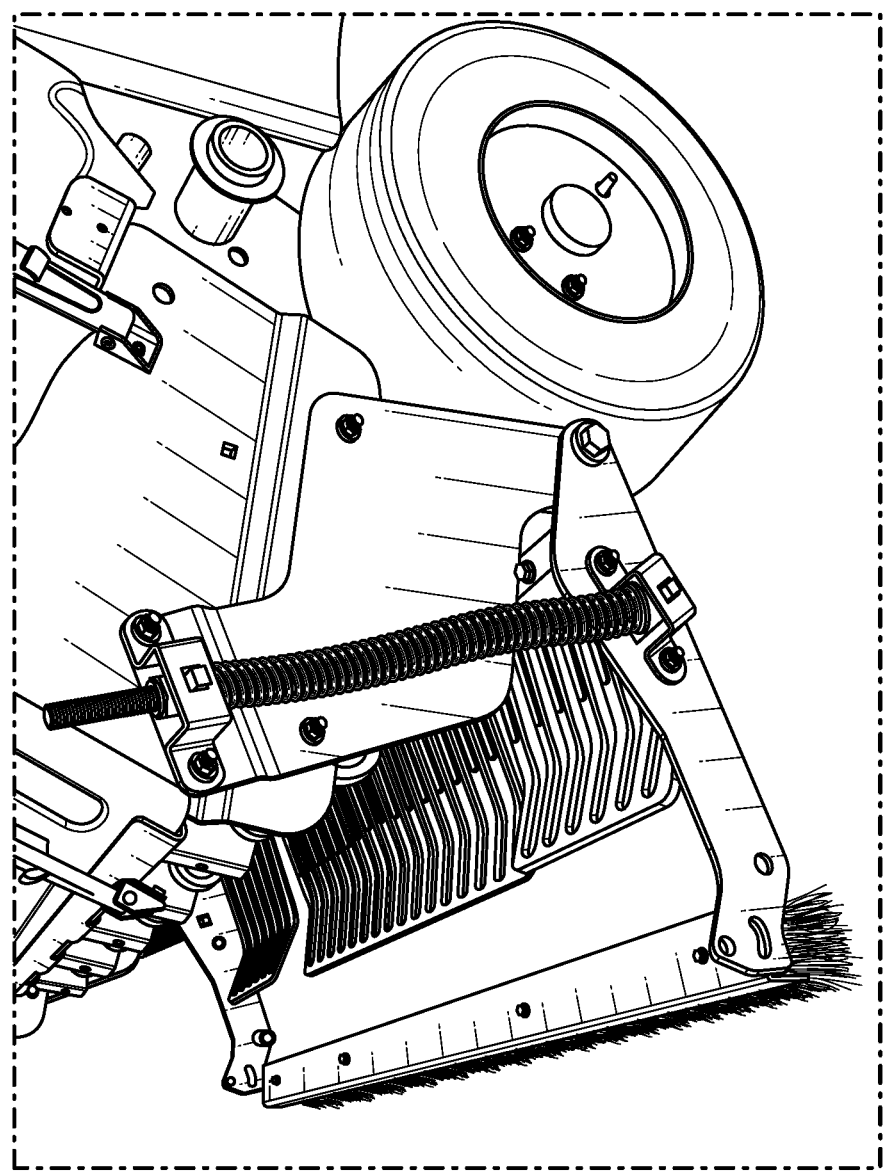
FIG. 6B illustrates an aeration spreader in a second stage of the retrofit method, in which the original roller has been removed from the prior art roller system, and an aeration brush is about to be coupled to the aeration spreader.
Figure 6C:
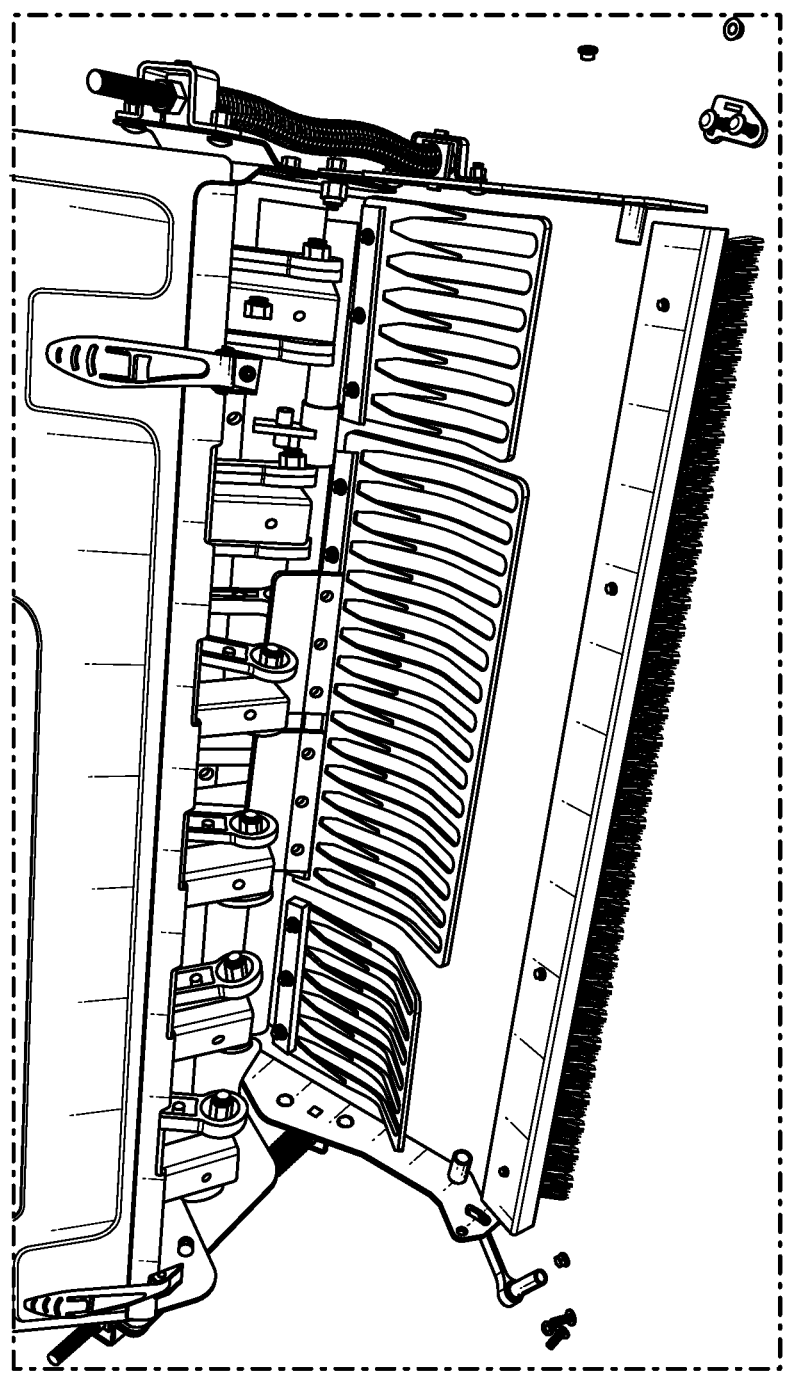
FIG. 6C illustrates another view of the aeration spreader of FIG. 6B in the second stage of the retrofit method, in which the original roller has been removed from the prior art roller system, and the aeration brush is about to be coupled to the aeration spreader.
Figure 6D:
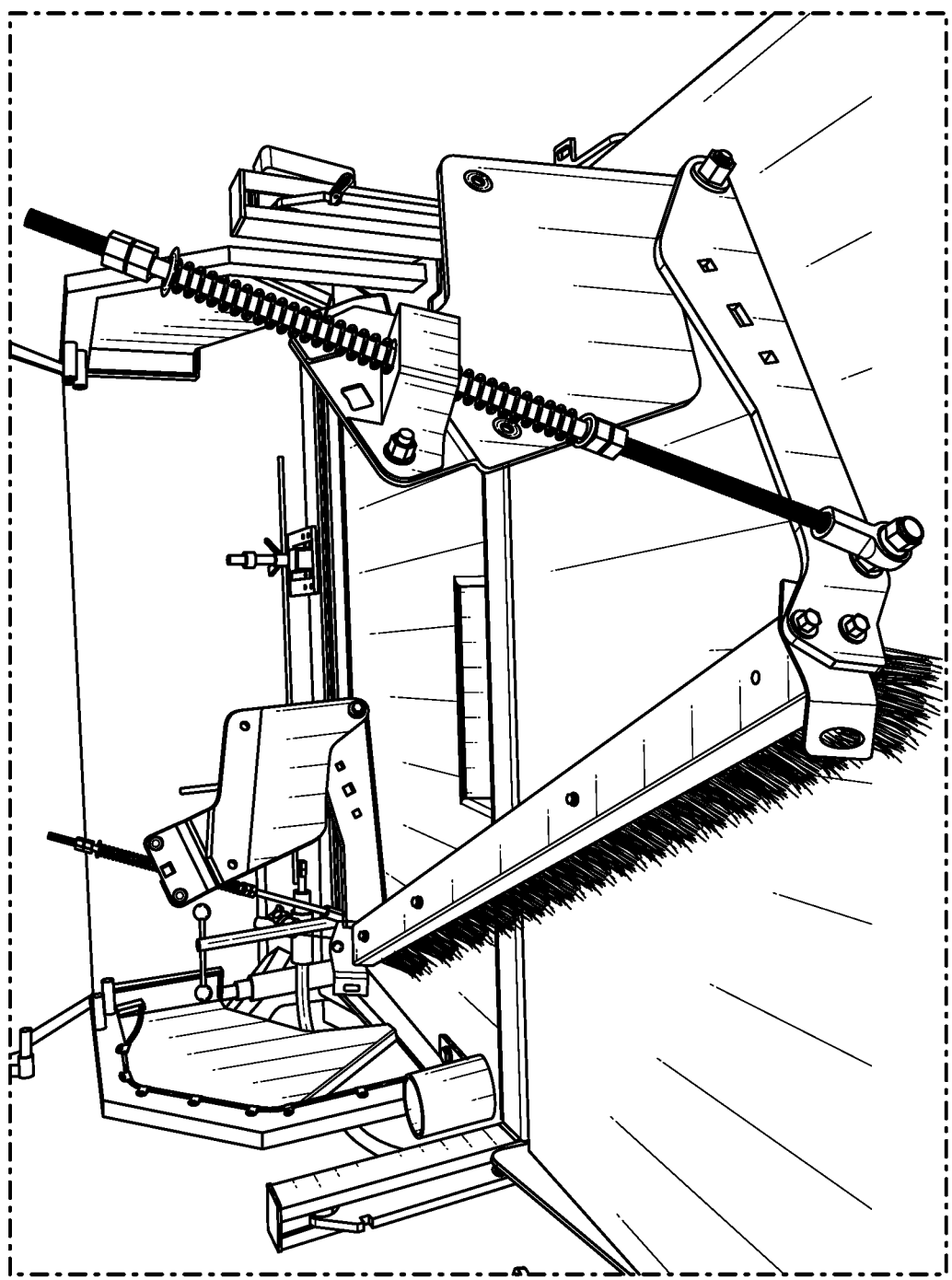
FIG. 6D illustrates the aeration spreader in a third stage of the retrofit method, in which the aeration brush and a new set of aeration springs have been coupled to the aeration spreader.

For example, FIGS. 6A-6D illustrate different stages in a method of modifying an existing roller system to become an aeration spreader. As illustrated in FIG. 6A, a first stage of the retrofit method includes obtaining or providing a prior art roller system that includes a set of springs and a roller. The prior art roller system will be modified by an aeration spreader "retrofit kit" that includes a new set of aeration springs and an aeration brush, as well as other components. As illustrated in FIG. 6B, a second stage of the retrofit method includes removing the roller from a prior art roller system, and beginning to couple an aeration brush to the device that becomes the aeration spreader. As illustrated in FIG. 6C, which is another view of FIG. 6B, the second stage of the retrofit method includes coupling the aeration brush to the aeration spreader. As illustrated in FIG. 6D, a third stage of the method includes coupling the aeration brush and the new set of aeration springs to the newly modified aeration spreader.

The method may further comprise coupling the spreader 104 to the aerator 102, such as with bolts extending through the holes 112 and 116. The method may further include threading the nuts 124, 126, 136, and/or 138 along the respective threaded shafts to adjust an overall rigidity of the suspension system, to adjust the overall height of the brush system 144, and/or to adjust a downforce exerted by the brush system 144 against the ground surface to desired levels. The method may further include topdressing a grassy surface to be aerated, such as a grassy surface of a golf course, such as with sand or another material. The method may further include driving the integrated aerator and spreader 100 across the grassy surface to aerate the grass and spread the sand into the holes formed by the aeration. In some alternative implementations, a method may include coupling the spreader 104 to a top dresser rather than to an aerator, and performing the same actions but without the aeration. In some alternative implementations, a method may include coupling the spreader 104 to an integrated top dresser and aerator, and performing the same actions described above such that the grassy surface is top dressed with sand, aerated, and has the sand spread into the holes left by the aeration. In such methods, the top dressing may be performed before or after the aeration.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method comprising:

accessing a spike aerator positioned on a rear end portion of a mobile aerator device, the spike aerator having a rear end portion, a first side, and a second side opposite the first side, removing a roller and a plurality of springs from the spike aerator;

attaching an aeration spreader to the rear end portion of the spike aerator, the aeration spreader including:
- a first mounting plate;
- a first attachment mount rigidly coupled to the first mounting plate;
- a first support arm rotatably coupled to the first mounting plate;
- a first support mount rigidly coupled to the first support arm, wherein the first attachment mount is located a first distance from the first support mount;
- a first shaft rotatably coupled to the first support mount, wherein the first shaft extends through the first attachment mount;
- a first adjustment mechanism coupled to the first shaft, wherein the first adjustment mechanism is located a second distance from the first support mount and the second distance is less than the first distance; and
- a second adjustment mechanism coupled to the first shaft, wherein the second adjustment mechanism is located a third distance from the first support mount and the third distance is greater than the first distance.

2. The method of claim 1, further comprising:

punching holes in a ground surface with the spike aerator as the mobile aerator device moves across the ground surface in a single pass of movement; and brushing sand, via the aeration spreader, into the punched holes in the ground surface made by the spike aerator as the mobile aerator device moves across the ground surface in the single pass of movement;

whereby prior to the single pass of movement of the mobile aerator device, a top dresser mobile device has laid sand across the ground surface to be brushed into the punched holes by the aeration spreader.

\* \* \* \* \*